United States Patent
Collins

(10) Patent No.: US 8,753,534 B2
(45) Date of Patent: Jun. 17, 2014

(54) FORMULATION AND METHOD FOR PREPARING GELS COMPRISING HYDROUS ALUMINUM OXIDE

(76) Inventor: Jack L. Collins, Knoxville, TN (US)

( * ) Notice: Subject to any disclaimer, the term of this patent is extended or adjusted under 35 U.S.C. 154(b) by 1069 days.

(21) Appl. No.: 12/683,925

(22) Filed: Jan. 7, 2010

(65) Prior Publication Data

US 2011/0163265 A1 Jul. 7, 2011

(51) Int. Cl.
*C09K 3/00* (2006.01)
*C01F 7/02* (2006.01)
*C01F 7/24* (2006.01)
*C01F 7/66* (2006.01)

(52) U.S. Cl.
USPC ........... 252/184; 516/93; 516/99; 516/100; 423/111; 423/395; 423/397

(58) Field of Classification Search
USPC ........... 252/184; 516/93, 99, 100; 423/111, 423/395, 397
See application file for complete search history.

(56) References Cited

U.S. PATENT DOCUMENTS

| | | | |
|---|---|---|---|
| 3,096,295 A * | 7/1963 | Michalko | 502/8 |
| 3,728,421 A | 4/1973 | Noothout | |
| 5,821,186 A | 10/1998 | Collins | |
| 6,599,493 B2 | 7/2003 | Collins et al. | |
| 6,602,919 B1 | 8/2003 | Collins | |

OTHER PUBLICATIONS

Collins et al., "Determination of Ideal Broth Formulations Needed to Prepare Hydrous Aluminum Oxide Microspheres via the Internal Gelation Process," ORNL/TM-2009/006, Feb. 1, 2009.
Collins et al., "Determination of Ideal Broth Formulations Needed to Prepare Hydrous Cerium Oxide Microspheres via the Internal Gelation Process," ORNL/TM-2009/007, Feb. 1, 2009.
Collins et al., "Determination of Ideal Broth Formulations Needed to Prepare Hydrous Hafnium Oxide Microspheres via the Internal Gelation Process," ORNL/TM-2009/008, Feb. 1, 2009.
Nomura et al., "Removal of Fluoride Ion from Wastewater by a Hydrous Cerium Oxide Adsorbent," in Emerging Technologies in Hazardous Waste Management, ACS Symposium Series 422, American Chemical Society, Washington, D.C., 1990, p. 157-172.
Egan et al., "Development and Testing of Inorganic Sorbents Made by the Internal Gelation Process for Radionuclide and Heavy Metal Separations," Task Summary prepared for the DOE Office of Science and Technology, Nov. 29, 1995.
Kumar et al., "Sol-Gel Synthesis of Simulated Inert Matrix Fuel: $ZrO_2$-$CeO_2$ Solid Solutions," in Inorganic Materials: Recent Advances, 2004, p. 115-120.
Arima et al., "Application of Internal Gelation to Sol-gel Synthesis of Ceria-doped Zirconia Microspheres as Nuclear Fuel Analogous Materials," Journal of Alloys and Compounds, v. 394, 2005, p. 271-276.

* cited by examiner

*Primary Examiner* — Michael Pepitone
(74) *Attorney, Agent, or Firm* — Brinks Gilson & Lione

(57) ABSTRACT

Formulations useful for preparing hydrous aluminum oxide gels contain a metal salt including aluminum, an organic base, and a complexing agent. Methods for preparing gels containing hydrous aluminum oxide include heating a formulation to a temperature sufficient to induce gel formation, where the formulation contains a metal salt including aluminum, an organic base, and a complexing agent.

18 Claims, 14 Drawing Sheets

---

Complexation/decomplexation $$2CO(NH_2)_2 + Al^{3+} \leftrightarrow Al[CO(NH_2)_2]_2^{3+}$$

Hydrolysis $$Al^{3+} + xH_2O \leftrightarrow Al(OH)_3 \cdot y(H_2O)_9 + 3H^+ \text{ and}$$

$$Al^{3+} + xH_2O \leftrightarrow AlO(OH) \cdot y(H_2O)_9 + 3H^+$$

HMTA protonation $$(CH_2)_6N_4 + H^+ \leftrightarrow (CH_2)_6N_4 \cdot H^+$$

HMTA decomposition $$(CH_2)_6N_4 \cdot H^+ + 3H^+ + 6H_2O \leftrightarrow 4NH_4^+ + 6CH_2O$$

Complexation/decomplexation $$2CO(NH_2)_2 + Al^{3+} \leftrightarrow Al[CO(NH_2)_2]_2^{3+}$$

Hydrolysis $$Al^{3+} + xH_2O \leftrightarrow Al(OH)_3 \cdot y(H_2O)_9 + 3H^+ \text{ and}$$

$$Al^{3+} + xH_2O \leftrightarrow AlO(OH) \cdot y(H_2O)_9 + 3H^+$$

HMTA protonation $$(CH_2)_6N_4 + H^+ \leftrightarrow (CH_2)_6N_4 \cdot H^+$$

HMTA decomposition $$(CH_2)_6N_4 \cdot H^+ + 3H^+ + 6H_2O \leftrightarrow 4NH_4^+ + 6CH_2O$$

FIG. 1

US 8,753,534 B2

FORMULATION AND METHOD FOR PREPARING GELS COMPRISING HYDROUS ALUMINUM OXIDE

GOVERNMENT SUPPORT

This invention was made with Government support under Contract No. DE-AC05-00OR22725 awarded by the U.S. Department of Energy. The Government has certain rights in this invention.

TECHNICAL FIELD

The present disclosure relates to formulations and methods for preparing hydrous metal oxide gels, and more particularly to formulations and methods for preparing hydrous aluminum oxide gels and spherules.

BACKGROUND

Hydrated oxides, acidic salts, and heteropoly acid salts of many metals (such as titanium, zirconium, hafnium, tin, aluminum, lead, cerium, tungsten, magnesium, manganese, etc.) are effective inorganic ion exchange materials. Inorganic ion exchangers are often stable in high radiation fields, and thus are particularly useful in the removal of radionuclides from waste streams. These inorganic ion exchangers typically have high selectivities and efficiencies for separating and removing fission products, actinides, and other elements from aqueous waste streams. Most of these materials are also compatible with matrices used for long term waste storage, such as in glass, phosphate, or grout. Certain metal oxides are known to be effective catalysts, such as in the photocatalytic decomposition of various hazardous organics. Also, many metal oxides are known to be effective getters for removing volatile fission products from off-gas streams.

Several inorganic exchangers and sorbents are commercially available as pure material in powder or granular form. However, these fine powders and granular particles are often not readily adaptable to continuous processing, such as in column chromatography. Moreover, they often have poor hydrodynamic properties. Some of these powders are fabricated into pellets by using binding materials; however, the binders can lessen the number of available exchange sites. The binders can also block pores and passageways to the exchange sites within the structures and can adversely affect the loading and kinetic behavior of the exchangers.

Another disadvantage of many of the powders, granular materials, and pellets is lack of sorbent reproducibility of the inorganic ion exchangers. These materials are prepared in batch processes in which chemical and physical gradients can occur that cause variances in the crystal morphology and compositions of the products. Also, the granular materials may not be very stable and can powder or erode, causing problems in column operations. Additionally, organic binders, when used to make the pellets, are often not stable when exposed to high radiation doses.

Attempts have been made to remedy the problems associated with powders and particles by forming gel particles. There are a number of gel forming processes used in the preparation of inorganic sorbents, catalysts, ceramics, and getters. Common to all these processes is that the constituents of the processes need to be suitable for the bonding of colloidal particles into gel structures. The gels usually are hydrous metal oxides. These processes are generally identified as "sol-gel" processes and the chemistries are complex and path dependent. Typically, they are defined as external or internal gelation processes. In external gelation processes, gelation reactions involve mass transfer to a second phase or fluid. By comparison, there is little or no mass transfer in internal gelation processes.

One of the original external gel processes for the preparation of nuclear fuels was developed at Oak Ridge National Laboratories. It was based on the gelation of colloidal sol droplets by extracting the water from them in an immiscible alcohol. In other external gelation processes, droplets of solutions of organic polymers or sols were chemically gelled with ammonia, usually by mass transfer of the ammonia from a surrounding gas or solution.

Making silica-alumina gel as spheres is an example of one internal gelation process. Gel spheres were made by continuously mixing an acid solution of $AlCl_3$ or $Al_2(SO_4)_3$ with sodium silicate as drops into an immiscible organic medium. The aqueous droplets gelled while in the organic medium. The key to this process was the slow or delayed gelation of silica when the sodium silicate was acidified.

The most widely studied internal gelation processes in recent years involves the water hydrolysis of metal alkoxides. In these processes, solution temperature and pH are key parameters used in controlling hydrolysis and polymerization. However, materials made by the metal alkoxide processes typically are fine powders. Additionally, due to the complex chemistries involved and the difficulty in operating the process, it is difficult to form gel-spheres of hydrous metal oxides wherein the reaction can be controlled and the final product made predictably.

SUMMARY

Disclosed herein are formulations and methods of forming hydrous metal oxide gels, specifically hydrous aluminum oxide gels, wherein the characteristics of the gel may be controlled to provide a gel which is useful for a variety of different applications, such as in inorganic ion exchange applications.

In one embodiment, formulations include a metal salt including aluminum, an organic base, and a complexing agent. The formulation has mole ratio of the organic base to the aluminum that ranges from greater than 0 to about 3.

In another embodiment, formulations include a metal salt including aluminum, an organic base, and a complexing agent. The formulation has a concentration of the aluminum that ranges from about 0.7 M to about 1.6 M.

In another embodiment, a method of preparing gels containing hydrous aluminum oxide includes heating a volume of a formulation to a temperature sufficient to induce gel formation, wherein the formulation contains a metal salt including aluminum, an organic base, and a complexing agent. The formulation has a mole ratio of the organic base to the aluminum that ranges from greater than 0 to about 3.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. More
- FIG. 1 shows an internal gelation process.

TABLE 1

Figure 2:
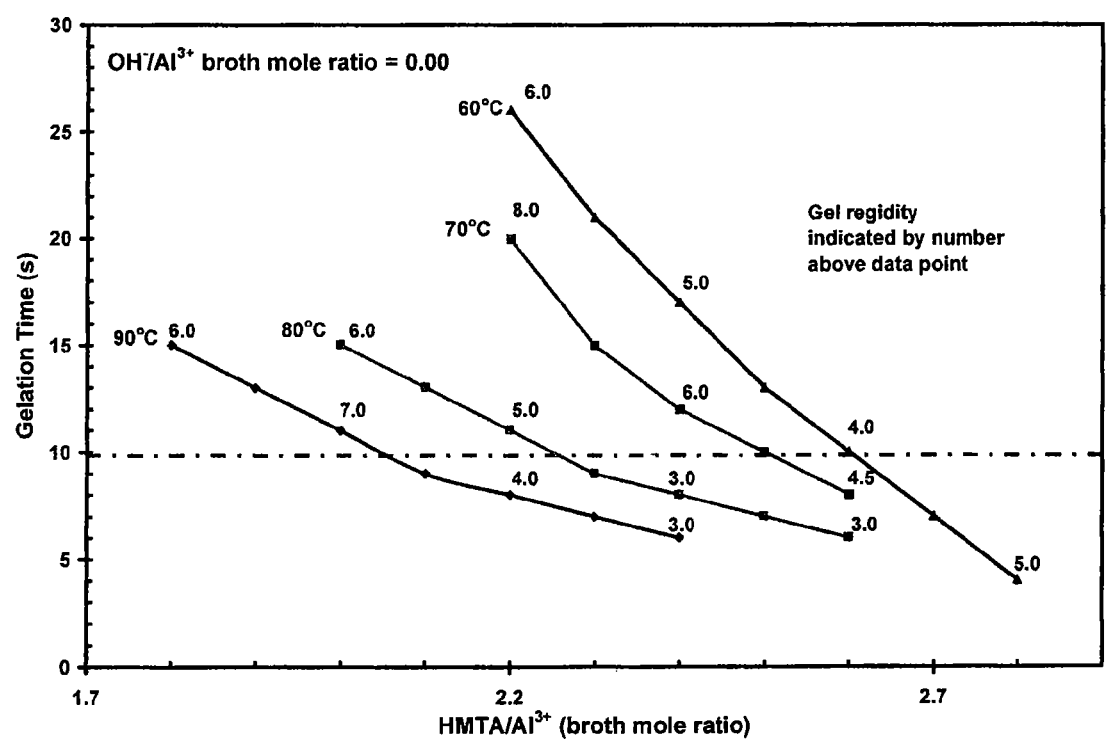
FIG. 2 illustrates gelation time as a function of HMTA/Al$^{3+}$ mole ratio.
Figure 3:
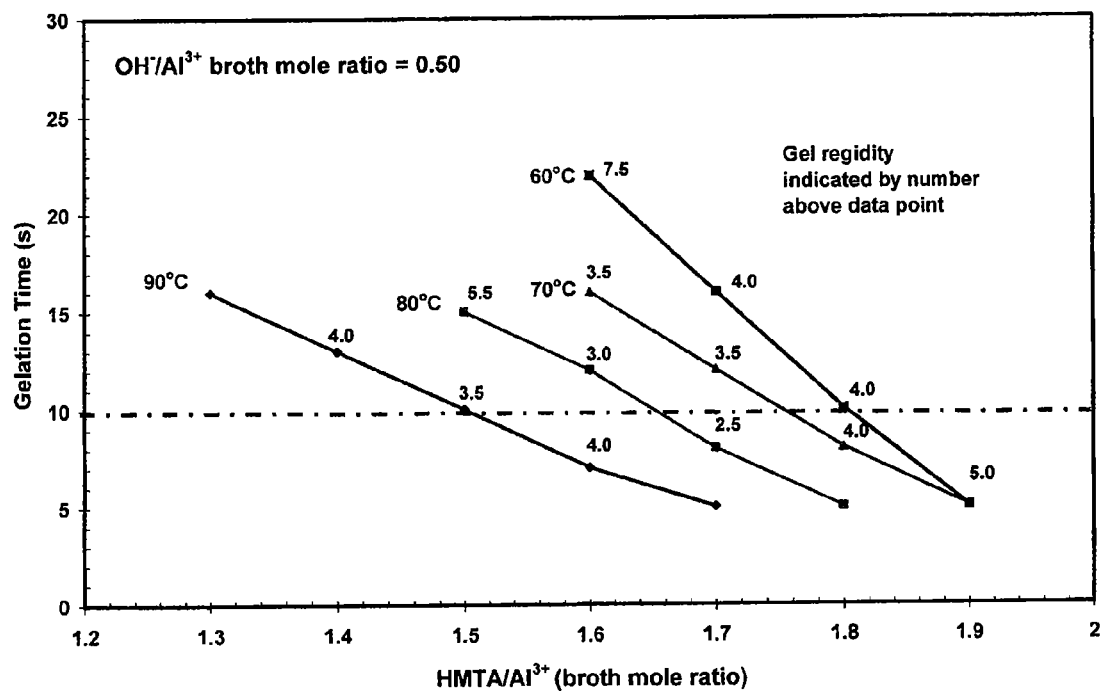
FIG. 3 illustrates gelation time as a function of HMTA/Al$^{3+}$ mole ratio.
Figure 4:
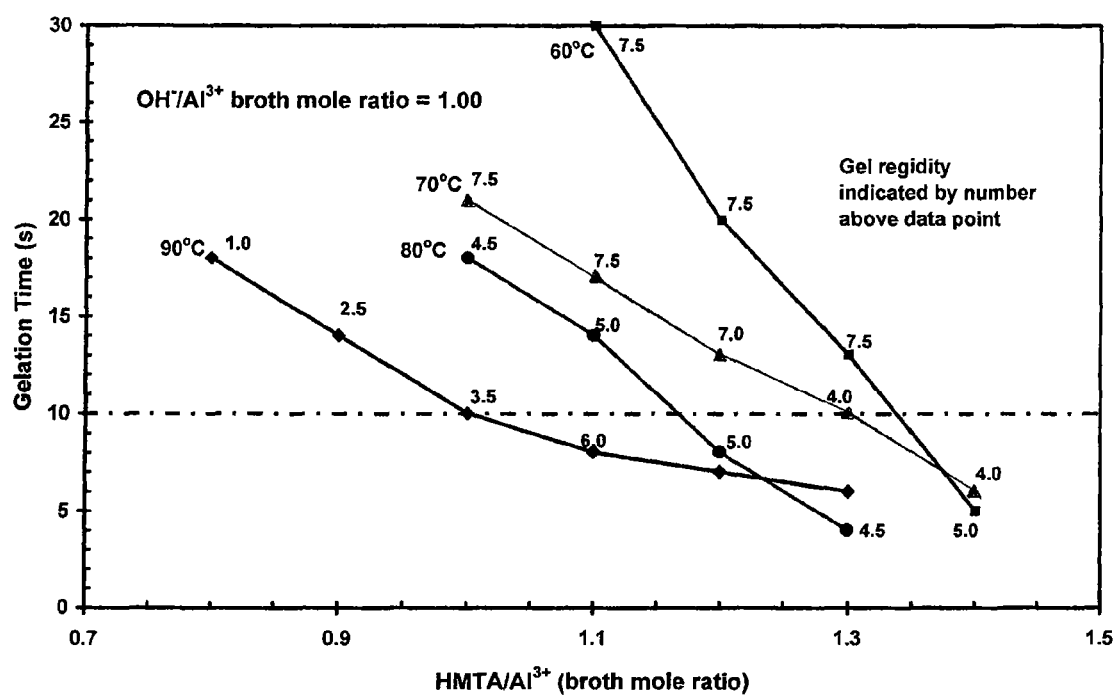
FIG. 4 illustrates gelation time as a function of HMTA/Al$^{3+}$ mole ratio.
Figure 5:
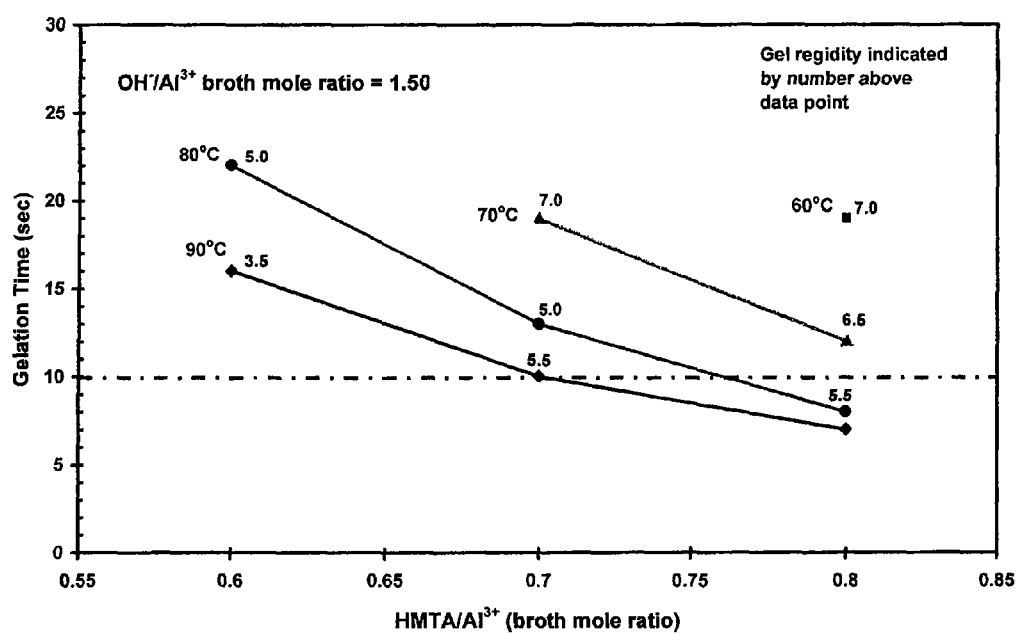
FIG. 5 illustrates gelation time as a function of HMTA/Al$^{3+}$ mole ratio.
Figure 6:
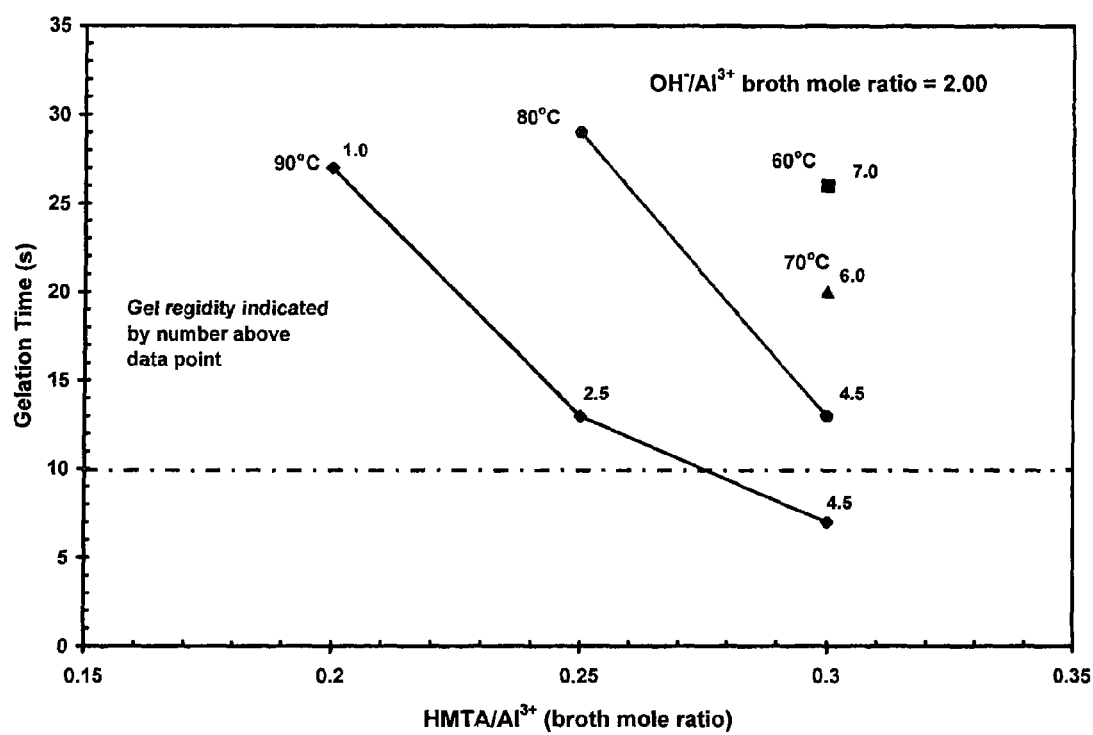
FIG. 6 illustrates gelation time as a function of HMTA/Al$^{3+}$ mole ratio.
Figure 7:
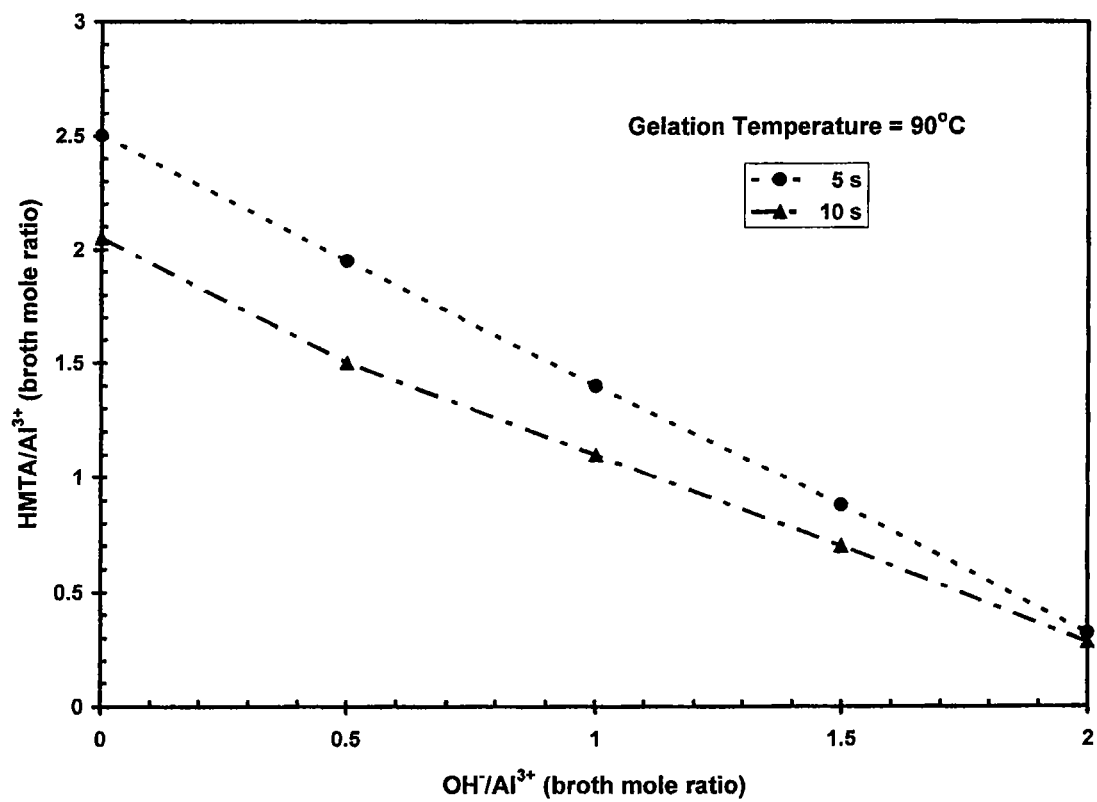
FIG. 7 illustrates gelation time as a function of HMTA/Al$^{3+}$ and OH$^-$/Al$^{3+}$ mole ratios.
Figure 8:
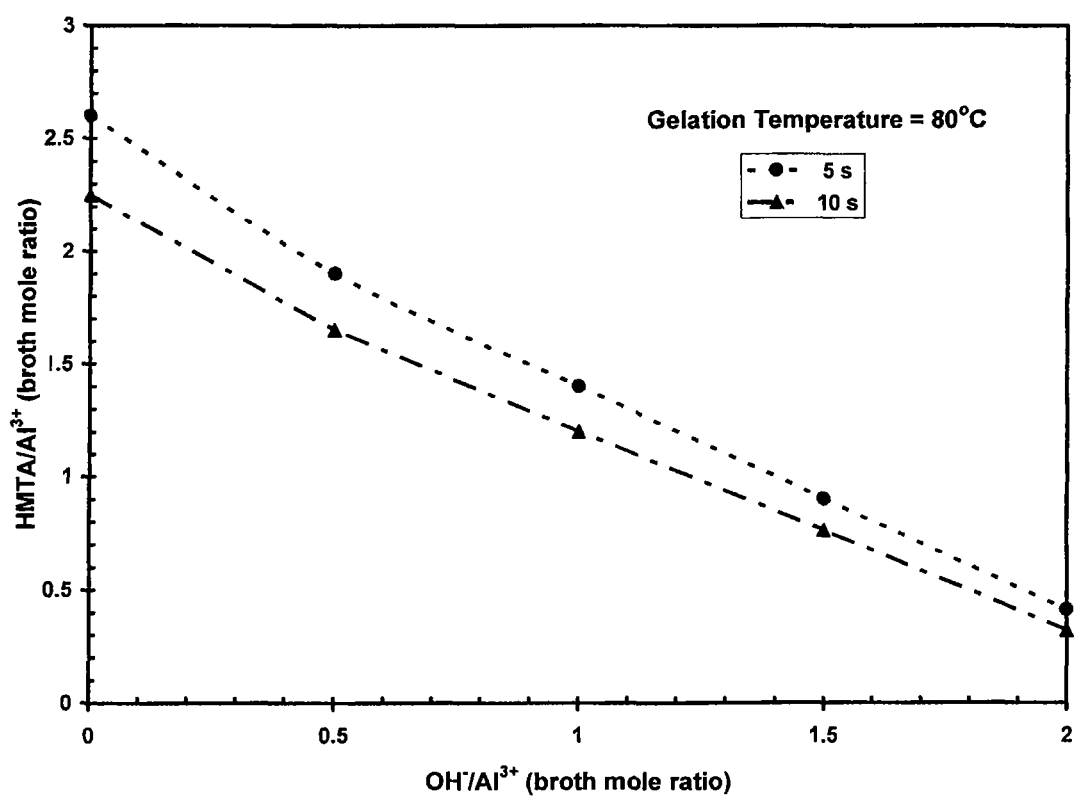
FIG. 8 illustrates gelation time as a function of HMTA/Al$^{3+}$ and OH$^-$/Al$^{3+}$ mole ratios.
Figure 9:
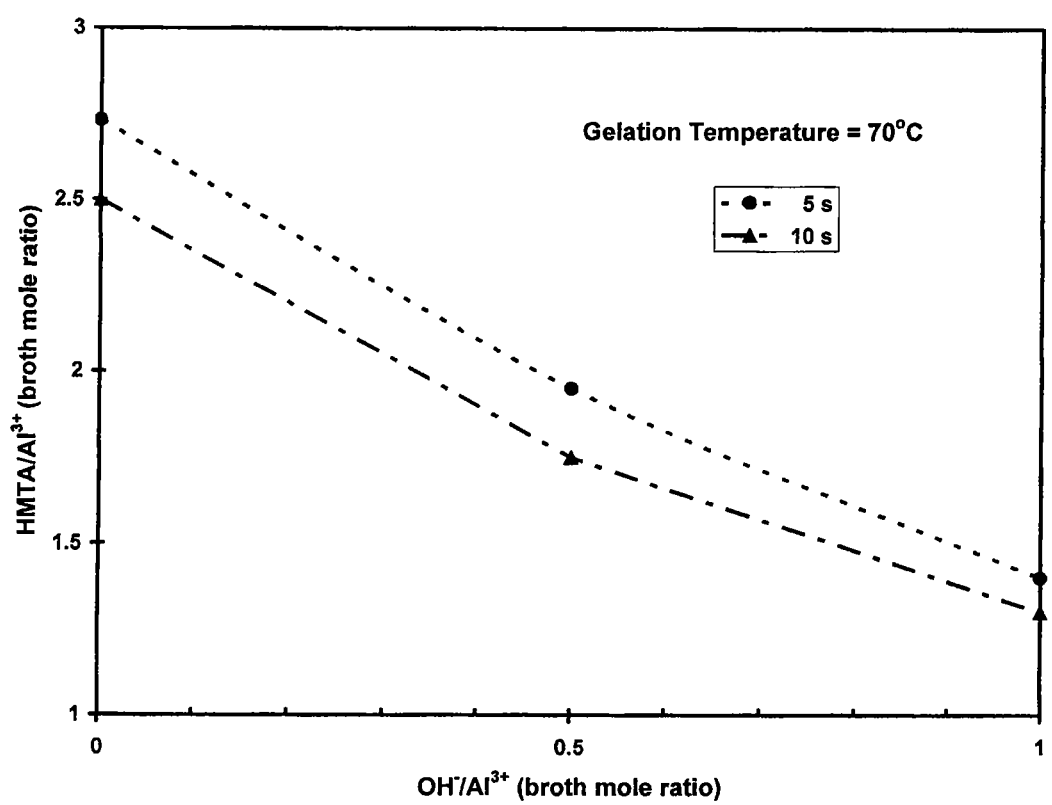
FIG. 9 illustrates gelation time as a function of HMTA/Al$^{3+}$ and OH$^-$/Al$^{3+}$ mole ratios.
Figure 10:
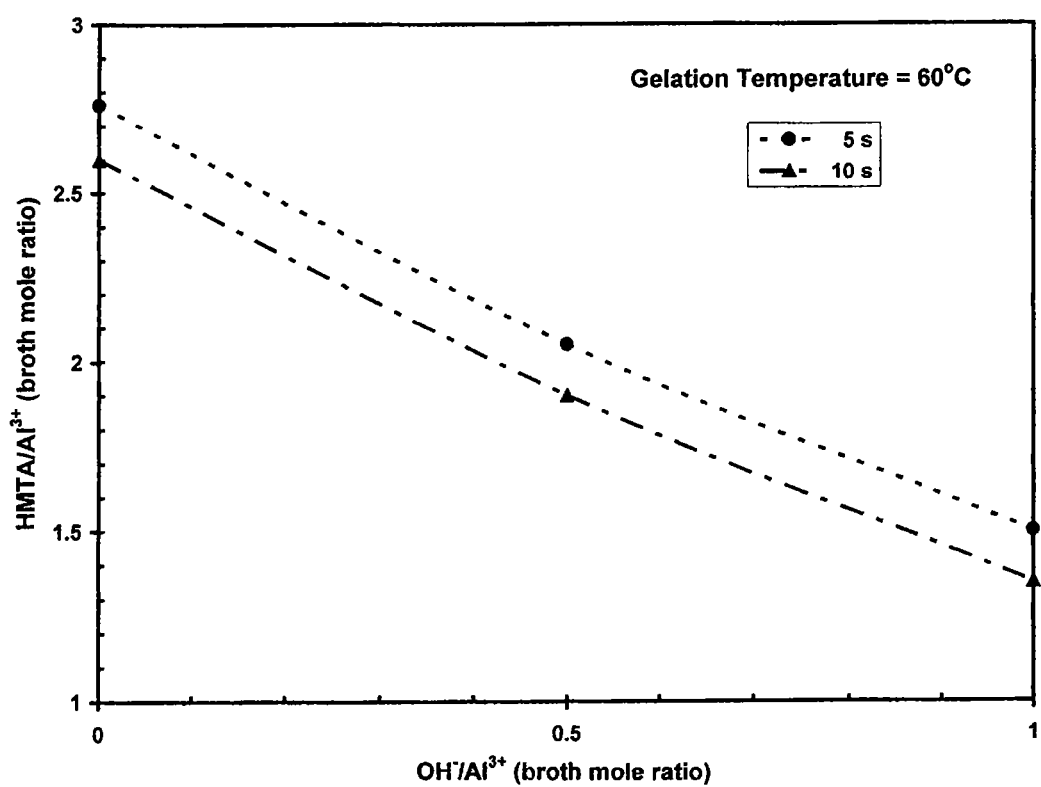
FIG. 10 illustrates gelation time as a function of HMTA/Al$^{3+}$ and OH$^-$/Al$^{3+}$ mole ratios.

| OH$^-$/Al$^{3+}$ (mole ratio) | HMTA/Al$^{3+}$ (mole ratio) | Al$^{3+}$ concentration in broth (M) |
|---|---|---|
| 0.00 | 2.8 | 0.767 |
| 0.00 | 2.6 | 0.806 |
| 0.00 | 2.4 | 0.849 |
| 0.00 | 2.2 | 0.896 |
| 0.00 | 2.0 | 0.949 |
| 0.00 | 1.8 | 1.009 |
| 0.00 | 1.6 | 1.155 |
| 0.50 | 2.8 | 0.748 |
| 0.50 | 2.6 | 0.785 |
| 0.50 | 2.4 | 0.825 |
| 0.50 | 2.2 | 0.870 |
| 0.50 | 2.0 | 0.920 |
| 0.50 | 1.8 | 0.976 |
| 0.50 | 1.6 | 1.039 |
| 1.00 | 1.2 | 1.480 |
| 1.00 | 1.1 | 1.190 |
| 1.00 | 1.0 | 1.237 |
| 1.00 | 0.9 | 1.287 |
| 1.00 | 0.8 | 1.341 |
| 1.00 | 0.7 | 1.399 |
| 1.00 | 0.6 | 1.463 |
| 1.00 | 0.5 | 1.534 |
| 1.50 | 0.9 | 1.233 |
| 1.50 | 0.8 | 1.283 |
| 1.50 | 0.7 | 1.336 |
| 1.50 | 0.6 | 1.394 |
| 2.00 | 0.5 | 1.390 |
| 2.00 | 0.4 | 1.453 |
| 2.00 | 0.3 | 1.522 |
| 2.00 | 0.2 | 1.598 |
| 2.00 | 0.1 | 1.682 |

DETAILED DESCRIPTION

The present disclosure relates to formulations and processes to prepare hydrous aluminum oxide gels. To prepare hydrous aluminum oxide gels, solutions can be prepared which comprise an aluminum metal salt, an organic base, and a complexing agent. These solutions may be referred to as "broth solutions." The concentrations of the constituents of the broth solution may be optimized to form stable broth solutions that can be used in a gel-forming operation to form hydrous aluminum oxide gels of preferred shape, size, hardness, and composition. The temperature and time of gelation may also be optimized to form aluminum oxide gels of preferred specifications.

Generally, a broth solution can be prepared by combining a first stock solution and a second stock solution. The first stock solution comprises an organic base and a complexing agent. The second stock solution comprises an aluminum metal salt. Preferably, each stock solution is cooled to less than about 10° Celsius, and more preferably to about 0° Celsius prior to combining. Then, when the two stock solutions are mixed, the final broth is chilled to less than approximately 10° Celsius. Preferably, broth solutions prepared are stable for a reasonable period of time at ice bath temperatures near 0° Celsius. A stable broth solution is one that remains clear and does not gel or precipitate for reasonable periods (≥1 hour) preferably at a temperature of 10° Celsius or less. Table 1 illustrates concentrations and mole ratios for exemplary stable broth solutions. Broth solutions that are stable for ≥1 hour are desirable for large scale preparations. However, broth solutions that gel in less than 1 hour can be used if, for example, the first stock solution and the second stock solution are pumped from separate containers into a mixing device prior to placement in a gel-forming operation.

Preferably, the organic base is hexamethylenetetramine (HMTA) and the complexing agent is urea. More preferably, the organic base is pure crystalline HMTA, rather than the more commonly used free flowing form. The free flowing form of HMTA contains additives that can be detrimental to the gelation process. Preferably, deionized water is used to prepare the first stock solution.

Aluminum metal salts that can be used include aluminum metal salts that are soluble and which can provide a sufficient aluminum ion concentration in aqueous solution. Examples of usable aluminum metal salts include, for example, aluminum trichloride and aluminum nitrate. Preferably, the aluminum metal salt is aluminum nitrate. Preferably, deionized water is used to prepare the second stock solution. Optionally, a base can be used to partially neutralize the aluminum stock solution. Partially neutralizing the aluminum stock solution allows a greater range of useable broth solutions with lower concentrations of organic base and lower temperatures for gel formation. Preferably, the base used to partially neutralize the aluminum stock solution is ammonium hydroxide.

Hydrous aluminum oxide gels can be formed using the broth solutions disclosed herein. Although not wishing to be bound by any theory, it is believed the gelation process includes the steps of: complexation and decomplexation of aluminum with the complexing agent; hydrolysis of aluminum to a hydrous aluminum oxide; hydrogen ion sequestration by the organic base; and decomposition of the protonated organic base. For example, where hexamethylenetetramine (HMTA) is used as the organic base and urea as the complexing agent, the internal gelation process may proceed as shown in FIG. 1. First, an aluminum urea complex forms between aluminum and urea. As the temperature of the broth solution is increased, decomplexation of the aluminum with urea allows hydrolysis of the aluminum, concomitantly producing hydrogen ions. HMTA, a weak organic base, drives the hydrolysis reaction to completion by sequestering the hydrogen ions. Additionally, HMTA acts as a buffer to maintain a pH of 4-7 in the broth solution; if the solution becomes too acidic or basic, the aluminum gels may dissolve. Once most of the HMTA molecules are protonated, they decompose into ammonia molecules, making the system even more basic in pH, thereby allowing sequestration of even more hydrogen ions. In some instances, typically at higher temperatures, urea may catalyze decomposition of protonated HMTA molecules. The hydrous aluminum oxide gels that result from this internal gelation process may be in the form of bohmite $(AlO(OH)_2)$ gels.

The broth solutions can be used to form spherules of hydrous aluminum oxide. Constituent concentrations, reaction temperature, and reaction time can be adjusted accordingly to obtain spherules of desired physical characteristics, as discussed further below.

Broth solutions used to form hydrous aluminum oxide spherules generally have HMTA/$Al^{3+}$ mole ratios of about ≤3, and $OH^-$/$Al^{3+}$ mole ratios of about ≤2. In some embodiments, it may be preferable to minimize the amount of HMTA used in broth solutions. The HMTA/$Al^{3+}$ mole ratio can be decreased through partial neutralization of the aluminum stock solution, with ammonium hydroxide for example. As the $OH^-$/$Al^{3+}$ mole ratio increases, the HMTA/$Al^{3+}$ mole ratio can be decreased because less HMTA is used. Additionally, the HMTA/$Al^{3+}$ mole ratio may be decreased where the broth solution will be used to form gels at higher temperatures, e.g., 80 or 90° Celsius. Table 1 shows broth solutions having HMTA/$Al^{3+}$ and $OH^-$/$Al^{3+}$ mole ratios ranging from about 0.1 to about 2.8, and 0.0 to about 2.0, respectively. However, broth solutions with higher and lower HMTA/$Al^{3+}$ and $OH^-$/$Al^{3+}$ mole ratios can be used.

FIGS. 2-6 show gelation time as a function of HMTA/$Al^{3+}$ mole ratio, with the $OH^-$/$Al^{3+}$ mole ratio at 0.00, 0.50, 1.00, 1.50, and 2.00, respectively. Gelation times are shown for broth solutions heated at 60, 70, 80, and 90° Celsius. Each of FIGS. 2-6 illustrate the effect of temperature and HMTA/$Al^{3+}$ mole ratio on gelation time; and collectively illustrate the effect of $OH^-$/$Al^{3+}$ mole ratio on gelation time. In one example, shown in FIG. 2, a broth solution can have a HMTA/$Al^{3+}$ mole ratio of about 2.8 and can be used to form a hydrous aluminum oxide gel having a gelation time of approximately 4 seconds at a 60° Celsius operating temperature. In another example shown in FIG. 5, a broth solution can have HMTA/$Al^{3+}$ and $OH^-$/$Al^{3+}$ mole ratios of 0.8 and 1.50, respectively, and can be used to form a hydrous aluminum oxide gel having a gelation time of approximately 9 seconds at an 80° Celsius operating temperature.

The concentration of aluminum in broth solutions preferably is in the range of about 0.7 M to about 1.7 M. However, broth solutions may be prepared having higher or lower aluminum concentrations, with the upper limit defined by the ability to prepare stable broth solutions, and the lower limit defined by the ability to prepare broth solutions that will gel in a gel-forming operation. The concentration of HMTA in broth solutions preferably is in the range of about 0.1 M to about 2.5 M. The concentration of $OH^-$ in broth solutions, when present, preferably is in the range of about 0.3 M to about 3.5 M. Generally, as the concentration of $OH^-$ increases, the concentration of HMTA decreases because less HMTA is used.

Broth solutions preferably have urea/$Al^{3+}$ mole ratios of about 1 or greater. In particular, where partially neutralized aluminum stock solutions are used to prepare the broths, to prepare broths that quickly clear (~5 minutes) of gel solids upon combining of the stock solutions it is preferable to have urea/$Al^{3+}$ mole ratios ≥1. In some instances, when the amount of urea is increased to aid in the preparation of clear, stable broth solutions, the amount of HMTA preferably is decreased.

Gel spherules prepared in accordance with the present disclosure are typically formed at temperatures from about 60° Celsius to about 90° Celsius. However, lower or higher temperatures may be used where the concentrations of the constituents permit, meaning that the broth solution can be adapted to a gel-forming operation at the selected operating temperature. For example, a high concentration of particular broth constituents may allow the gelation reaction to be performed at lower temperatures and/or shorter gelation time, with the upper limit on concentration defined by the ability to form stable broth solutions. Conversely, a low concentration of particular broth constituents may allow the gelation reaction to be performed at higher temperatures and/or longer gelation times, with the lower limit on concentration defined by the ability to form gels from the broth.

Preferably, spherules are formed by a gelation process wherein gelation occurs in about 10 seconds or less. Where gelation times begin to exceed about 10 seconds, microdroplets of broth solution can coalesce and form larger droplets prior to gelation. In some instances, spherules resulting from coalesced droplets may cause problems in the gel-forming operation. In addition, such spherules may not provide hydrous aluminum oxide spherules of the desired specifications. Preferably, spherules produced are structurally strong spherules.

FIGS. 7-12 illustrate preferred broth solutions for producing hydrous aluminum oxide spherules. In particular, FIGS. 7-12 show broth solutions which gel in 5 or 10 seconds as a function of HMTA/$Al^{3+}$ and $OH^-$/$Al^{3+}$ mole ratios. Depending on the desired gel-forming operation parameters (temperature, gelation time, and constituent concentration), a preferred broth solution can be selected.

Figure 13:
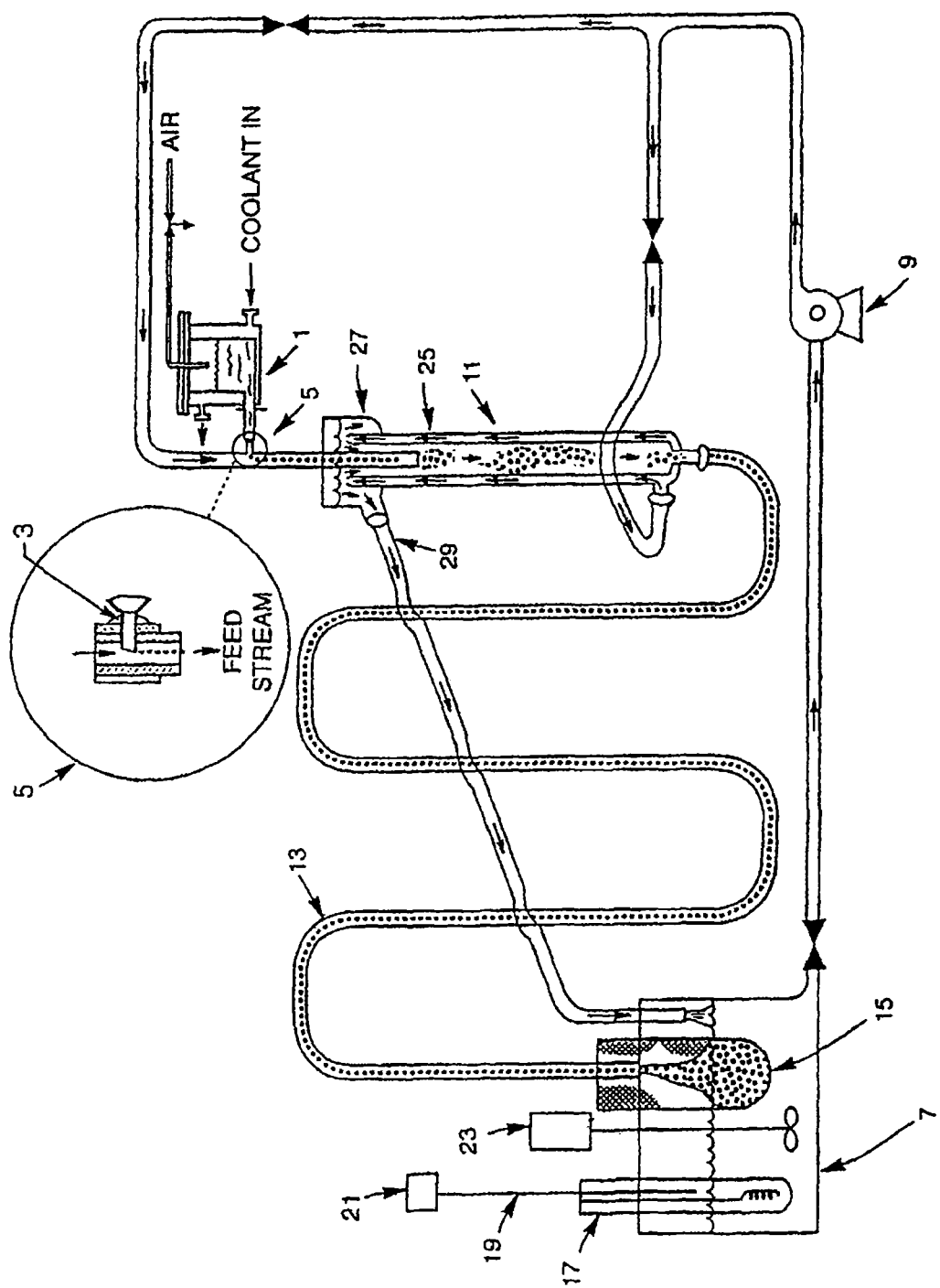
FIG. 13 illustrates an apparatus useful for preparing hydrous aluminum oxide gel spherules.

In one embodiment, the hydrous aluminum oxide spherules are produced by a gel-forming operation as demonstrated in FIG. 13. A chilled broth is first prepared and then added to the chilled apparatus broth pot 1 and processed through the gel-forming or spherule forming apparatus. The system also includes a needle 3 which is used in a two-fluid nozzle 5 for placing broth droplets in a hot organic medium where gelation occurs.

The organic medium is preferably water-immiscible with a density slightly higher than that of the aqueous broth solution. Large droplets are best formed if there is a density difference between the organic medium and broth of about 0.05 to 0.10 g/cm$^3$. The density difference can be different for small droplets. The organic medium may be a one-component solvent or a binary mixture. For example, silicone oils, such as Silicon Fluid 200 (Dow Corning, Midland, Mich.), work well for the temperature range from ambient temperatures to 100° Celsius. A mixture of approximately 75% perchloroethylene (PERC) and 25% isoamyl alcohol (IAA) can be used at temperatures up to about 90° Celsius. Trichloroethylene (TCE) can be used at temperatures of ≤65° Celsius. Kerosine type hydrocarbons and 2-ethyl-1-hexanol may also be used as gel forming media.

If the gel-forming medium has a high viscosity or boiling point (e.g., PERC, 2-ethyl-1-hexanol or silicone oil), the residual medium on the gelled spherules often is removed by washing with a more volatile organic medium. TCE, carbon tetrachloride or hexane can be used for silicone oil; isopropyl alcohol for PERC; and carbon tetrachloride for 2-ethyl-1-hexanol. Neither TCE nor the 75% PERC, 25% isoamyl alcohol mixture require an organic wash after aging of the gel.

Introduction of the aqueous broth droplets into a flowing stream of hot, water-immiscible, organic medium causes decomplexation of the aluminum complexed with the complexing agent, allowing hydrolysis and gelation of aluminum to occur. The hydrolysis reaction is driven by protonation of the organic base molecules, which effectively removes $H^+$ from the broth. The hydrolysis reaction is also driven, in some cases, by the decomposition of the protonated organic base molecules to form ammonia molecules. The rate at which these reactions take place depends on both temperature and the concentration of the broth constituents. Generally, when gelation occurs, the pH value of the broth droplets will be at, or above, the pH value of precipitation. Hydrous aluminum oxide gels at a pH of about 4 in a nitrate or chloride solution.

In the gel-forming process, the organic medium is heated at a temperature in the range of 45° Celsius to 100° Celsius, preferably in the range of 60° Celsius to 90° Celsius. Preferably, gelation time is ≤60 seconds. More preferably, gelation time is ≤30 seconds. Most preferably, gelation time is ≤10 seconds. As the microdroplets of the broth remain ungelled in the organic medium, they may coalesce and form larger droplets, which in some cases is less preferred.

The system of FIG. 13 includes a reservoir 7 for heating the organic medium, a pump 9 for circulating the organic medium, a chilled broth pot 1, a two-fluid nozzle system 5 for controlling the size of the broth droplets, a glass gelation column (forming column) 11, a downstream transport line 13 to provide a residence time for the gel spherules to hydrolyze and solidify, and a product collector 15 for collecting and aging the gelled spherules and also for separating the organic medium from the gelled spherules.

The organic medium reservoir 7 may comprise a stainless steel open-top rectangular container. One or more heating blades 17 may be positioned at the rear of the reservoir to heat the organic medium. A thermocouple 19 may be positioned in the basket at the bottom and near the front of the reservoir and connected to a temperature controller 21 used to control the organic medium temperature. A stirrer 23 with its shaft positioned away from the heating blade or blades 17 (other blades not shown) and its impeller located near the bottom of the reservoir is used to mix and maintain the organic medium at a desired temperature. Occupying most of the front space in the reservoir 7 is a large removable basket 15 which serves as a backup to prevent any spilled gelled spherules from being pumped out of the reservoir circulating pump.

The pump 9 is used to pump the hot organic medium from the reservoir 7 through a line to the vertically positioned glass gelation column 11. The flow from the pump 9 is divided into two streams which are controlled by manual valves. The flow of one of the streams may be routed to a position above the center of the top of the gelation column 11. Vertically attached to this line may be a tube whose outlet end is inserted into the entrance of the gelation column. The tube is part of the two-fluid nozzle 5 system that is used to control the size of the droplets. The other hot organic medium stream from the pump 9 is routed to a fitting at the bottom of the gelation column 11 and flows up through a shell 25 that surrounds the gelation column 11. The hot organic medium over-flows at the top of the column, first into the gelation column 11, and then into an overflow cup 27. A large tube 29 is connected to a fitting from the overflow cup 27 to route any overflow back to the hot organic medium reservoir 7. During operation, the flow of organic medium from the heating shell 25 is normally adjusted to provide only a slight overflow.

As shown in FIG. 13, the two-fluid nozzle system 5 comprises a needle 3 which is perpendicularly inserted through the wall of the tube to the midpoint of the hot organic medium carrier stream and is positioned approximately 5 inches above the entrance to the gelation column 11. The chilled broth is jetted into the laminar flowing oil by air pressurizing the broth pot 1, forcing the broth out a tube at the bottom of the broth pot through a short plastic line that is connected to the needle 3. The size of the droplets formed is dependent on the gauge of the needle and the flow rates of the hot organic medium and of the broth.

The hot organic medium carrying the droplets from the two-fluid nozzle tube 5 flows directly into the central concurrent flow tube of the jacketed gelation column 11 where it is desirable for the droplets to begin to gel. On exiting the gelation column 11, the gelling spheres flow into a serpentine transport line 13. This line is long enough (about 8 feet) to allow the gelling spherules to have a total residence time of 25 to 35 seconds to the collection basket 15. The transport time also includes the time the spherules are passing through the gelation column. The gelation column and serpentine transport system are designed to be a siphoning system with a gravity head of about 60 cm for oil temperatures in the range of about 55° Celsius to 100° Celsius.

The collection basket 15 is positioned above the hot organic medium reservoir 7, and is used to collect and separate the gel spherules from the hot organic medium as they exit the serpentine transport line 13. Preferably, the collected gel spherules are aged by lowering the collection basket 15 into the reservoir 7. Aging the gel spherules assures completion of aluminum hydrolysis and reproducibility of the gelation process. The degree of aging can influence the type of gel structure obtained. After being held in the heated organic medium for a period of ≤60 minutes, preferably between 10 and 30 minutes, to allow for completeness of gelation and for aging, the spherules are removed from the organic medium. After aging, the bulk of the organic medium is drained from the gel spherules and the residual organic medium is removed by a series of washing steps to remove reaction impurities. If silicone oil, 2-ethyl-1-hexanol, or PERC is used as the organic medium, the residual medium is removed with an organic solvent, such as for example trichloroethylene, before basic washing with an aqueous medium. Remaining impurities can be removed from the gelled spherules by washing with ammonium hydroxide solutions with a pH of ≤10 or with a concentration of ≤0.00005 M, or alternatively, with 0.001 M ammonium nitrate solutions with a pH of 6. The spheres can subsequently be washed with deionized water.

Another basket of similar design may also be positioned above the hot oil reservoir to filter the return organic medium from a tube which is connected to the overflow drain line at the top of the gelation column.

Hydrous aluminum oxide gels prepared in accordance with the present disclosure can provide gels in a range of rigidities from soft to very hard as selected by adjustment of the above gelation parameters. Initially, a nominal scale of 1 to 10 collins units of rigidity was used to define the rigidity of the gel. A unit of 1 collins represents gels with the approximate consistency of water and 10 collins represents gels that are almost too hard to penetrate with a spatula. Most of the gels formed using broth parameters of the present disclosure had rigidities between 3 collins and 8 collins.

Applications

Hydrous aluminum oxide gels of desirable shape, size, rigidity, and composition can be prepared using the optimum parameters and broth solutions as described. For example, spherules of pure hydrous aluminum oxide may be prepared using the broth solutions and methods presently disclosed. The spherules may be of specific size, such as for example, from 0.1 mm to 2 mm in diameter. Spherules may also be produced in accordance with the present disclosure wherein hydrous aluminum oxide spherules contain particles of other chemicals, metals, and biochemicals homogeneously dispersed throughout the matrix of the gel. These materials may be embedded homogenously throughout the gel matrix to produce dual-purpose ion exchangers capable of removing several different contaminants from a waste stream. In some cases, gelantinous spherules of hydrous aluminum oxide can be converted by chemical reactions to other ion exchanger spherules. The hydrous aluminum oxide spherules can also be converted to other chemical forms, including, but not limited to, tungstate, molybdate, vanadate, and selenate. Furthermore, to create more surface area, spherules can be prepared containing embedded particles of material that can subsequently be dissolved and removed to create larger, interconnecting pores within the spherules.

In one embodiment, the hydrous aluminum oxide gels may be formed into spherules for use in ion exchange applications. The hydrous aluminum oxide spherules can be reproducibly made on a small or large scale. Preparation of inorganic ion exchangers as spherules improves the flow dynamics for column operations and expands their practical applications. For example, one advantage is that the densities and/or porosities of the spherules can be tailored by varying process parameters to produce a finished spherule that is optimally designed for a specific sorption process. In addition, the inorganic exchanger spherules have sorption characteristics that are equal to or better than those obtained for most commercial powders tested.

Some ion exchange applications for hydrous aluminum oxide spherules include removing certain fission products and actinides from waste streams in which the pH is in the range of 4-10. Because of the amphoteric nature of hydrous aluminum oxide, the spherules may dissolve if the contact solution has a pH less than 4 and greater than 10. $Al_2O_3$ (gamma form) is reported to be an excellent sorbent for Cs(I), Sr(II), Eu(III), Co(II), and Cd(II) in the pH range of 5-9. In that pH range, sorption depends strongly on pH and less on salt concentration. For pH>9, the salt dependence of the distribution coefficient becomes more important. $Al_2O_3$ can be prepared by heating hydrous aluminum oxide at 350° C. for 2 days. An engineered form of $Al_2O_3$, spherules for example, can be obtained using the presently disclosed broth formulations and operating conditions.

Hydrous aluminum oxide gels can also be made or fabricated into, for example, films, slabs, and fibers. These gels may be used alone, or post-treated as set forth above, to be used as inorganic ion exchangers, catalysts, getters, dielectric materials, and ceramic materials in systems which may preclude the use of spherules.

The formulations and methods of the present disclosure can also be useful for the preparation of gels for potential use in capillary, film or slab gel electrophoresis. For example, the gel formulations may be vacuumed into capillary tubes that are then heated to cause formation of fibrous gels. The tubes or fibers may be either of hydrous aluminum oxide or aluminum oxide. Additionally, these tubes or fibers may include suspendable particles, such as fine nickel powder with particle diameters less than 1 μm, which are homogeneously embedded within the hydrous aluminum oxide or aluminum oxide tubes or fibers. These tubes and fibers are prepared by first forming the broth, either with or without additional particles therein. Then, the broth is formed into a gel, which is then formed into a fiber or a tube. This process may be performed using a number of different tube or fiber forming techniques. For example, the broth may be pulled through an electrophoresis capillary tube. Then, the tube may be heated to form the gel tube. Alternatively, the broth may be formed into gel spherules which are placed in an extruder and extruded into microfibers. The gels can be washed to remove reaction impurities. After washing with deionized water to remove the urea, HMTA, and $NH_4NO_3$, these tubes and fibers may also be heated to drive off water to form aluminum oxide fibers.

In a similar manner, other shapes of the hydrous aluminum oxide may be formed, such as films or slabs. The gel formulations may be drawn into molding cavities and heated to form the gel film or slab. The surfaces of the molding cavities may be pretreated to facilitate removal of the gels. Once removed from the molds, the gels can be washed to remove reaction impurities. Alternatively, the broth may be formed into gel spherules which are placed in an extruder and extruded into thin films. The films or slabs may be heated to drive off water to form aluminum oxide films or slabs.

Nickel aluminum oxide spherules can be prepared and used, for example, as catalysts for the hydrogenation of aromatic hydrocarbons. The formulations and methods described herein can be used to make an engineered form of this material. For example, fine nickel metal particles with a diameter of <1 micrometer (preferably in the 20 to 90 nanometer range) can be added to the broth solutions. $Al_2O_3$ spherules can be made in which the percentage of nickel can be set to a percentage≤50. Preferably, after preparation, such gels are thoroughly washed with deionized water and then dried in an inert atmosphere, such as nitrogen, helium, or argon containing about 4% hydrogen, drying at a temperature of 230 to 550° Celsius to make the spherules catalytically active.

Macroporous spherules of aluminum hydroxide and aluminum oxide can be prepared from non-dried hydrous aluminum oxide gel spherules by employing a method described by S. J. Teichner for making aerogels ("AEROGELS—Why They Are Vogue," Chem. Tech, pp. 372-377, June 1991), the disclosure of which is hereby incorporated by reference. To prepare macroporous spherules of aluminum hydroxide oxide, hydrous aluminum oxide spherules are first prepared and then washed thoroughly to remove reaction products. The gel spherules are soaked in absolute ethanol several times to replace the water in the spherules with ethanol. The spherules are drained and placed in a pressure vessel that also contains a small volume of absolute ethanol. The spherules are heated and pressurized at slightly above the critical temperature (240.7° Celsius) and the critical pressure (60.52 atm). The pressure is provided by the vapor pressure of the ethanol in the vessel and by applying additional pressure as needed with a non-reactive gas (such as dry air, nitrogen, or argon). Once these conditions are met, the ethanol in the pressure vessel can be slowly vented from the pressure vessel while the critical pressure is maintained with the non-reactive gas. Once the ethanol is purged from the system, the vessel is cooled and the spherules removed. This process prevents the shrinkage of the gel spherules that is caused under normal drying conditions by the movement of the liquid phase in the gel capillaries by evaporation. The surface tension of the liquid creates a concave meniscus in each capillary. As the liquid evaporates, the meniscus recedes, and the compressive forces on the walls of the pores of the internal gel framework collapse, resulting in shrinkage. The liquid-vapor interface occurs only below the critical temperature and pressure of the liquid. Above the critical point the liquid no longer exists. The dried macroporous spherules are in the aluminum hydroxide form and can be dried at higher temperatures to form macroporous spherules of aluminum oxide. The same process can also be used to make composite macroporous spherules that contain fine catalytic particles (such as Ni, Pd, Pt, or Ag)

that are homogeneously dispersed in the matrix. The fine catalytic particles may be selected from organic catalysts or inorganic catalysts. These spherules containing catalytic particles can be used, for example, in inorganic syntheses and for converting toxic organics to nontoxic organics in waste treatment.

Certain broth formulations of the present invention may be used to provide more control in making ultra fine hydrous aluminum oxide spherules (1 to 5 μm) with an electric dispersion reactor (EDR), described in a U.S. Pat. No. 5,207,973 by M. T. Harris, T. C. Scott, and C. H. Byers entitled "Method and Apparatus for the Production of Metal Oxide Powder" (issued May1993).

EXAMPLES

Example 1

Preparation of Stock Solutions

The following procedure can be used to prepare stock solutions. For example, five aluminum stock solutions were prepared with the following concentrations: 2.335 M $Al(NO_3)_3$; 2.164 M $Al(OH)_{0.6}(NO_3)_{2.5}$; 2.017 M $Al(OH)_{1.0}(NO_3)_{2.0}$; 1.888 M $Al(OH)_{1.5}(NO_3)_{1.5}$; and 1.775 M $Al(OH)_{2.0}(NO_3)_{1.0}$. The partially neutralized aluminum stock solutions can be prepared by slowly adding chilled 14.8 M $NH_4OH$ and deionized water to predetermined volumes of chilled 2.335 M $Al(NO_3)_3$ stock solution. The exact volume of $NH_4OH$ can be obtained by weighing the reagent on an analytical balance.

A 3.17 M HMTA+3.17 M urea stock solution can be prepared with a density of 1.14 g/mL. The solubility of HMTA in water at room temperature is about 3.7 M. A good technical grade of crystalline HMTA is preferred for the internal gelation process of the present disclosure. In particular, additives used to make HMTA free flowing cause an undesirable reaction to occur between the HMTA and urea. This reaction can be detrimental to the internal gelation process, thereby making it less reproducible, especially for runs at higher temperatures (i.e., >80° Celsius). This behavior is observed when samples of about 3.2 M HMTA (free flowing type) and about 3.2 M urea are heated together at 95° Celsius for several minutes. The solution develops a pearl-essence that intensifies with time. While the crystalline form of HMTA is preferred, the free flowing form of HMTA can be used in some applications, especially at temperatures<80° Celsius and for some applications at temperatures>80° Celsius, depending upon which additives the manufacturer added to the HMTA to facilitate its free flowing properties.

In using these stock solutions to prepare clear broths, longer mixing times are used for broths with $OH^-/Al^{3+}$ mole ratios of >1. Where shorter mixing times are preferable, HMTA/urea stock solutions are prepared with higher urea concentrations and lower HMTA concentrations, resulting in urea/$Al^{3+}$ mole ratios of ≥1 in the broth solutions.

Example 2

Broth Stability Tests

A stable broth is one that remains clear and does not gel or precipitate for reasonable periods of time (usually about 1 hour) at 10° Celsius or less. Broths can be prepared using aluminum stock solutions and HMTA/urea stock solutions, and each can be tested for broth stability according to the following procedure.

A rack for holding thin-walled glass centrifuge tubes is placed in an ice bath. Glass tubes are preferred to plastic tubes. Predetermined volumes of 3.17 M HMTA/3.17 M urea stock solution and stock solution of aluminum are separately and carefully pipetted to the tubes with calibrated electronic pipettes, and the tubes are subsequently chilled for approximately 20 minutes. The centrifuge tubes containing the aluminum stock solutions also serve as the broth tubes and are labeled accordingly as to stock solution and the HMTA/$Al^{3+}$ and $OH^-$/$Al^{3+}$ mole ratios.

To prepare a broth, a volume of chilled HMTA/urea stock solution is carefully removed with a pipette and transferred to a centrifuge tube containing the aluminum stock solution. The broth is then mixed with a Teflon stirring rod and the broth is observed until there is the first visual sign of gelation or a period of 1 hour passes. The time of gelation is recorded. Tests are done in duplicate.

A broth formulation with a $OH^-/Al^{3+}$ mole ratio of ≥1 clears quickly when the chilled stock solutions are mixed, if the urea/$Al^{3+}$ mole ratio is ≥1. Several broths can be prepared in which the concentrations of HMTA and urea vary. By increasing the concentration of urea, the concentration of HMTA has to be decreased to provide a clear saturated stock solution.

One of the stock solutions prepared was 2.5 M in HMTA and 4.7 M in urea. When mixed with an aluminum stock solution, a broth was provided with a 1.18 M $Al^{3+}$ concentration and had $OH^-/Al^{3+}$, HMTA/$Al^{3+}$, and urea/$Al^{3+}$ mole ratios of 1.5, 0.8, and 1.5, respectively. It was clear after being mixed 4.5 minutes. For a comparable 1.28 M $Al^{3+}$ broth with $OH^-/Al^{3+}$, HMTA/$Al^{3+}$, and urea/$Al^{3+}$ mole ratios of 1.5, 0.8, and 0.8, respectively, it was clear after being mixed approximately 15 minutes. A 3.17 M and 3.17 M urea stock solution was used to prepare this broth solution. In another broth solution with $OH^-/Al^{3+}$, HMTA/$Al^{3+}$, and urea/$Al^{3+}$ mole ratios of 1.5, 0.8, and 1.28, respectively, it was clear after being mixed 5 minutes. Thus, to obtain a broth that quickly clears of gel solids when chilled stock solutions are mixed, broth solutions preferably have urea/$Al^{3+}$ mole ratios of ≥1.

Example 3

Gelation Tests

Gelation tests can be performed according to the following procedure. A predetermined volume of an aluminum stock solution (at room temperature) is carefully pipetted into the bottom of a glass centrifuge tube in an ice bath. The required volume of HMTA/urea stock solution is pipetted into the bottom of a separate polypropylene centrifuge tube and placed in an ice bath. Both are chilled for 10 minutes to attain ice bath temperature. The chilled HMTA/urea stock solution is then quantitatively and slowly pipetted into the chilled aluminum stock solution and mixed well. Care is taken not to splash the broth onto the test tube walls. The broth is maintained in the ice bath for an additional 5 minutes.

The broth tube is then placed in a hot water bath at the desired temperature. The test tube is gently swirled in the water bath to observe when the gel sets. A stopwatch is used to measure the time in the bath needed for gelation to occur. When gelation begins, the clear broth becomes viscous and motionless. The gel is then allowed to age for 10 minutes in the hot bath at the same temperature.

The test tube is then removed from the hot bath, and the gel is allowed to cool to room temperature. The transparency of the gel on a scale of 1 to 10 (1 being transparent, 4 being translucent, 7 being opaque, and 10 being crystalline white) is subjectively determined and recorded. The rigidity of the gel is determined by inserting a spatula into the center of the gel and is quantified on a subjective scale of 1 (no resistance, almost like water) to 10 (high resistance, difficult to penetrate). FIGS. 2-6 provide rigidity values for many of the data points. The values generally range from 1 to 7. Most gels which form in ≤10 seconds at 60 or 70° Celsius are in the 4 to 5 rigidity range and have $OH^-/Al^{3+}$ mole ratios of ≤1. Broth solutions with $OH^-/Al^{3+}$ mole ratios of 1.5 or 2.0 generally do not gel in ≤10 seconds at 60 or 70° Celsius. Thus, when using broth solutions having $OH^-/Al^{3+}$ mole ratios of 1.5 or 2.0, it may be preferable to run the gel-forming operation at an 80 or 90° Celsius operating temperature. The rigidities of broth solutions having $OH^-/Al^{3+}$ mole ratios of 1.5 or 2.0 and gelled at 80 or 90° Celsius have rigidities in the 4.5 to 5.5 range. Some of the broth solutions with gelation times of 10 seconds or less form gels having rigidity values of 7.

For example, a broth with a 1.18 M $Al^{3+}$ concentration and $OH^-/Al^{3+}$, $HMTA/Al^{3+}$, and urea/$Al^{3+}$ mole ratios of 1.5, 0.8, and 1.5, respectively, gels in 9 seconds at 80° Celsius and the rigidity is 6 after 10 minutes of aging. In another example, a broth with a 1.28 M $Al^{3+}$ concentration and $OH^-/Al^{3+}$, $HMTA/Al^{3+}$, and urea/$Al^{3+}$ mole ratios of 1.5, 0.8, and 0.8, respectively, gels in 9 seconds at 80° Celsius and the rigidity is 5.5 after 10 minutes of aging.

After a gelled broth solution is aged, the gel is then broken up by stirring with the spatula. Afterward, the test tube is centrifuged to remove pockets of air and to compact the gel into the bottom of the tube. A calibrated pH probe is inserted into the gel to measure the pH. It can take up to 30 seconds for the pH reading to stabilize. The pH values of the aged gels are generally >4.9; most are in the 5 to 5.4 range, indicating the completeness of gelation.

As a minimum, duplicates of each broth are tested to ensure accuracy. If the gel times and properties match, the test results are assumed to be valid. If the gel times do not match, additional tests are conducted to resolve the problem and obtain consistent values.

Example 4

Determination of Optimum Broth Formulations

Optimum broth constituent concentrations, as well as gelation reaction time and temperature are set forth below in the text and the referenced figures. Table 1 illustrates concentrations and mole ratios for exemplary stable broth solutions that can be used to form hydrous aluminum oxide gels.

FIGS. 2-6 illustrate broth solution gelation time as a function of $HMTA/Al^{3+}$ mole ratio for broth solutions heated at 60, 70, 80, and 90° Celsius. The gel rigidity is given at each data point. The data indicates that as the $OH^-/Al^{3+}$ mole ratio increases from 0.00 to 2.00, less HMTA is needed for broth formulations to gel in ≤10 seconds at each temperature tested. Further, as the temperature increases, less HMTA is needed to gel in ≤10 seconds.

The data provide a large number of formulations that can be used to prepare hydrous aluminum oxide spheres. Considering the economics of gel-forming operations, broth solutions with lower gel-forming temperatures, such as 60-70° Celsius, may be preferred. Further, to minimize the amount of HMTA used, broths with higher $OH^-/Al^{3+}$ mole ratios may be preferred.

Figure 11:
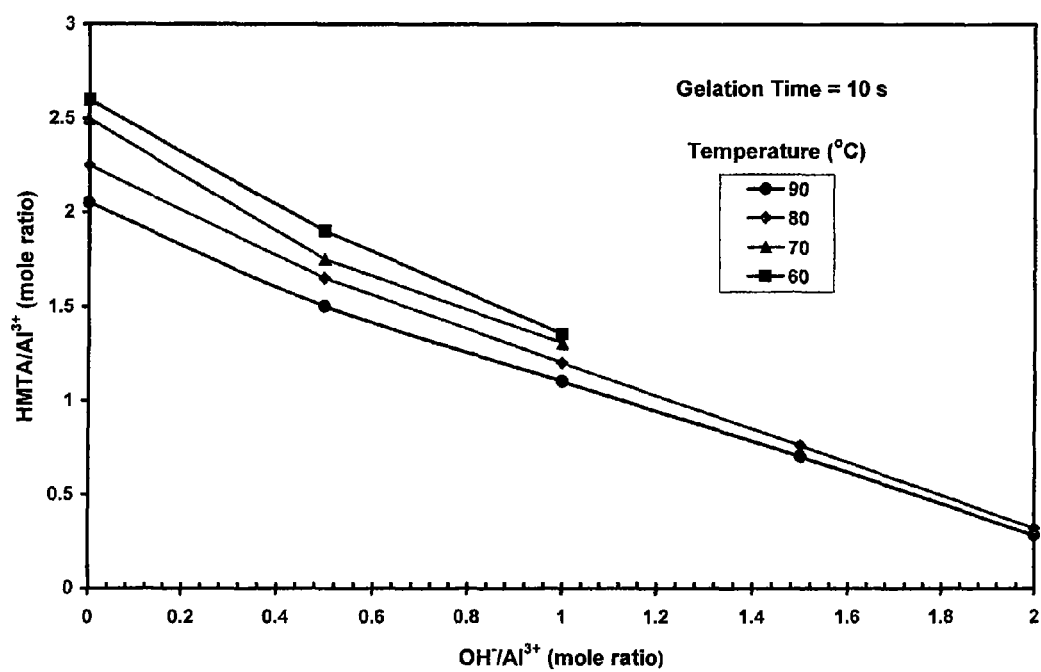
FIG. 11 illustrates gelation time as a function of HMTA/Al$^{3+}$ and OH$^-$/Al$^{3+}$ mole ratios.
Figure 12:
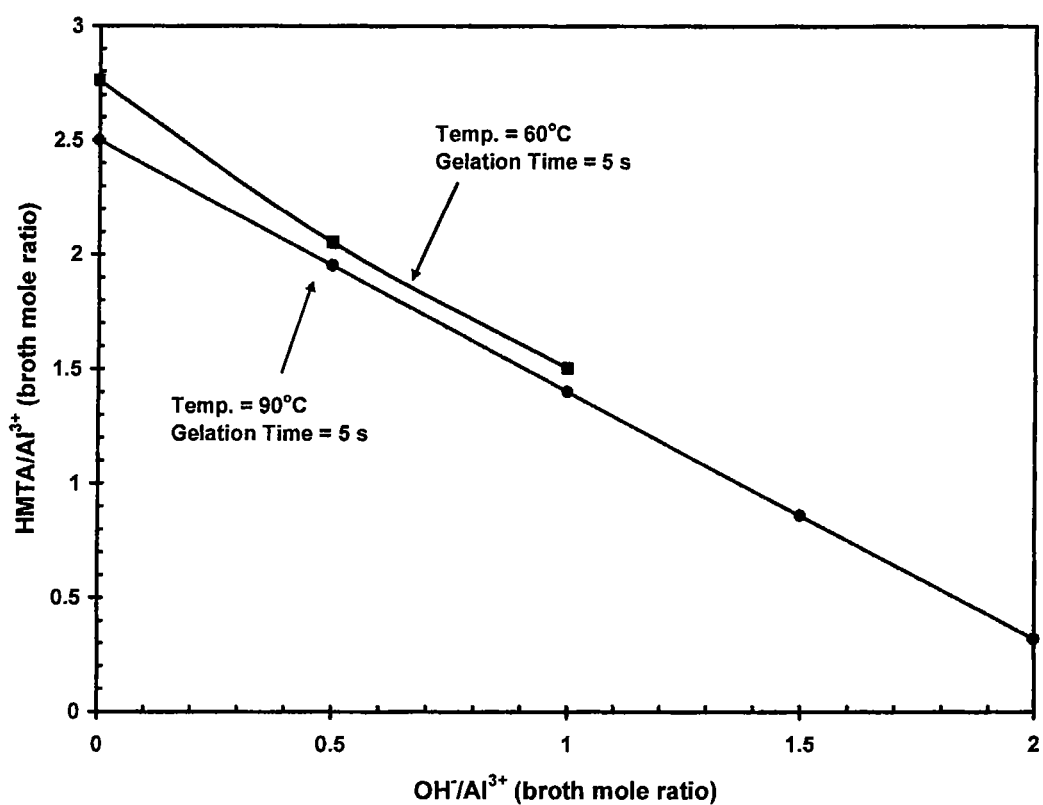
FIG. 12 illustrates gelation time as a function of HMTA/Al$^{3+}$ and OH$^-$/Al$^{3+}$ mole ratios.

FIGS. 7-10 illustrate gelation time as a function of $HMTA/Al^{3+}$ and $OH^-/Al^{3+}$ mole ratios for broth solutions having 5 and 10 second gelation times at gel-forming temperatures of 90, 80, 70, and 60° Celsius, respectively. These plots, as well as those of FIGS. 11-12, provide data to select optimum broth solutions for the intended application. For example, broth droplets that gel in 5 seconds may be preferred for small scale operations employing small-diameter, lab-scale, gel-forming columns. Alternatively, in larger scale gel forming operations, somewhat higher gelation times may be preferred.

Example 5

Hydrous Aluminum Oxide Microsphere Preparation

Figure 14:
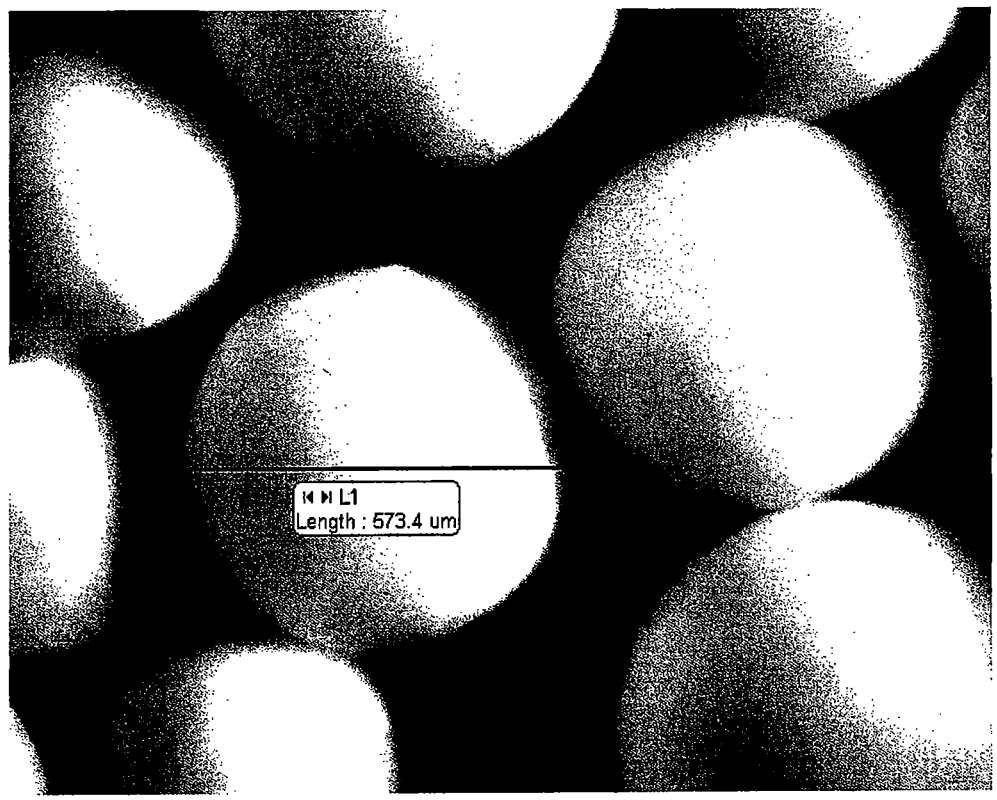
FIG. 14 shows a microscopic image of hydrous aluminum oxide spherules.

Hydrous aluminum oxide microspheres can be prepared according to the following procedure. In this preparation, 123.2 mL of broth is prepared by slowly mixing 73.2 mL of chilled 3.19 M HMTA+3.19 M urea solution (0 to 5° Celsius) with 50.0 mL of chilled 2.335 M aluminum nitrate stock solution. The broth has $HMTA/Al^{3+}$, urea/$Al^{3O}$, and $OH^-/Al^{3+}$ mole ratios of 2.0, 2.0, and 0.0, respectively. The concentrations of $Al^{3+}$, HMTA, and urea for the broth are 0.95, 1.9, and 1.9 M, respectively. A two-fluid nozzle system with a 21 gauge flat-tipped needle is used to provide the broth droplets. The broth droplets are introduced from the tip of the needle into a flowing stream of heated immiscible organic medium (approximately 90° Celsius). Silicone oil (Dow Corning 200 silicone fluid) is used in this preparation. From there, the droplets are transported into the gel-forming apparatus. The droplet size is controlled by using a two-fluid nozzle concept and varying the gauge of the needle and the flow rates of the hot silicone oil and the chilled broth. The droplets begin to gel in 10 to 11 seconds and are subsequently collected in a stainless steel mesh basket downstream. It takes approximately 30 seconds for the gelled microspheres to reach the basket. The run lasts approximately 40 minutes. Afterward, the microspheres are aged for 20 minutes in silicone oil at approximately 80° Celsius to complete the gelation process, then washed six times with trichloroethylene to remove the silicone oil, and then washed six times with 0.00005 M $NH_4OH$ (pH=9.5) to remove reaction impurities. The bead volume after the washing steps is approximately 158 mL. If these beads were dried, calcined, and sintered, about 10.3 g $Al_2O_3$ of beads theoretically could be produced if 100% recovery were possible. Theoretical density of $Al_2O_3$ is 3.97 g/mL. The measured tap density of the air dried microspheres is 1.02 g/mL. The gel time is about the same as predicted by the tests to determine optimum broth formulations. FIG. 14 is a 10× microscopic image of a sample of air dried hydrous aluminum oxide microspheres. The microspheres are in the 400 to 799 μm diameter range.

Formulations and methods of forming hydrous aluminum oxide gels have been disclosed. The characteristics of the gels may be controlled to provide a gel which is useful for a variety of different applications, such as in inorganic ion exchange applications.

While various embodiments of the present disclosure of formulations and methods for preparing hydrous aluminum oxide gels have been described, it will be apparent to those of ordinary skill in the art that many more embodiments and implementations are possible within the scope of the invention. Accordingly, the presently disclosed formulations and methods are not to be restricted except in light of the attached claims and their equivalents.

What is claimed is:

1. A formulation for preparing gels, the formulation comprising:
   a metal salt comprising aluminum in the form of aluminum nitrate;
   an organic base; and
   a complexing agent, wherein a mole ratio of the organic base to the aluminum ranges from greater than 0 to about 3; and a mole ratio of the complexing agent to the aluminum is at least about 1.

2. The formulation of claim 1, wherein a mole ratio of the organic base to the aluminum ranges from about 0.1 to about 2.8.

3. The formulation of claim 1, wherein a concentration of the aluminum ranges from about 0.7 M to about 1.7 M.

4. The formulation of claim 1, wherein a concentration of the organic base ranges from about 0.1 M to about 2.5 M.

5. The formulation of claim 1, further comprising a source of hydroxide.

6. The formulation of claim 5, wherein a mole ratio of the hydroxide to the aluminum ranges from greater than 0 to about 2.

7. The formulation of claim 5, wherein the source of hydroxide comprises ammonium hydroxide.

8. The formulation of claim 1, wherein the organic base comprises hexamethylenetetramine, and the complexing agent comprises urea.

9. The formulation of claim 1, wherein a concentration of the aluminum ranges from about 0.7 M to about 1.7 M, a concentration of the organic base ranges from about 0.1 M to about 2.5 M, the organic base comprises hexamethylenetetramine and the complexing agent comprises urea.

10. The formulation of claim 9, further comprising a source of hydroxide, wherein a mole ratio of the hydroxide to the aluminum ranges from greater than 0 to about 2, and the source of hydroxide comprises ammonium hydroxide.

11. The formulation of claim 9 wherein the mole ratio of the organic base to the aluminum ranges from about 0.1 to about 2.8.

12. The formulation of claim 11, further comprising a source of hydroxide, wherein a mole ratio of the hydroxide to the aluminum ranges from greater than 0 to about 2, and the source of hydroxide comprises ammonium hydroxide.

13. A formulation for preparing gels, the formulation comprising:
a metal salt comprising aluminum in the form of aluminum nitrate;
an organic base; and
a complexing agent,
wherein a concentration of the aluminum ranges from about 0.7 M to about 1.7 M.

14. The formulation of claim 13, wherein a concentration of the organic base ranges from about 0.1 M to about 2.5 M.

15. The formulation of claim 13, further comprising a source of hydroxide, wherein a concentration of the hydroxide ranges from about 0.3 M to about 3.5 M.

16. A method of preparing gels comprising hydrous aluminum oxide, the method comprising heating a volume of a formulation to a temperature sufficient to induce gel formation, wherein the formulation comprises:
a metal salt comprising aluminum in the form of aluminum nitrate;
an organic base; and
a complexing agent,
wherein a mole ratio of the organic base to the aluminum ranges from greater than 0 to about 3; and a mole ratio of the complexing agent to the aluminum is at least about 1.

17. The method of claim 16, wherein the volume of the formulation is heated to a temperature of at least about 60° Celsius.

18. The method of claim 17, wherein the volume of the formulation is heated to a temperature of about 60° Celsius to about 90° Celsius.

* * * * *